(12) United States Patent
Yoshidome

(10) Patent No.: US 10,701,232 B1
(45) Date of Patent: Jun. 30, 2020

(54) AUTOMATED RUNNING OF IMAGE-PROCESSING INSTRUCTIONS FROM STICKY NOTES

(71) Applicant: Kyocera Document Solutions Inc., Osaka (JP)

(72) Inventor: Gin Yoshidome, San Ramon, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/455,508

(22) Filed: Jun. 27, 2019

(51) Int. Cl.
*H04N 1/00* (2006.01)

(52) U.S. Cl.
CPC ..... *H04N 1/00968* (2013.01); *H04N 1/00331* (2013.01); *H04N 1/00411* (2013.01); *H04N 1/00498* (2013.01); *H04N 1/00602* (2013.01); *H04N 1/00615* (2013.01); *H04N 1/00628* (2013.01); *H04N 1/00649* (2013.01); *H04N 2201/0094* (2013.01)

(58) Field of Classification Search
CPC ........... H04N 1/00968; H04N 1/00331; H04N 1/00411; H04N 1/00498; H04N 1/00602; H04N 1/00615; H04N 1/00628; H04N 1/00649; H04N 2201/0094
See application file for complete search history.

(56) References Cited

U.S. PATENT DOCUMENTS

| 9,695,006 | B1 | 7/2017 | Yoshidome | |
| 2016/0321500 | A1* | 11/2016 | Tokita | G06F 16/93 |
| 2017/0244850 | A1* | 8/2017 | Ishitori | H04N 1/00708 |

* cited by examiner

*Primary Examiner* — Quang N Vo
(74) *Attorney, Agent, or Firm* — James Judge

(57) ABSTRACT

A method for automatically running a command from a note sheet detachably attached to a document includes scanning the document with the note sheet, automatically detaching the note sheet from the document, scanning the note sheet separately from the note-sheet-detached document and, recognizing text written on the scanned note sheet, extracting one or more commands from a database corresponding to the recognized text, and automatically running the one or more commands for executing one or more corresponding image-processing jobs on the note-sheet-detached document.

19 Claims, 13 Drawing Sheets

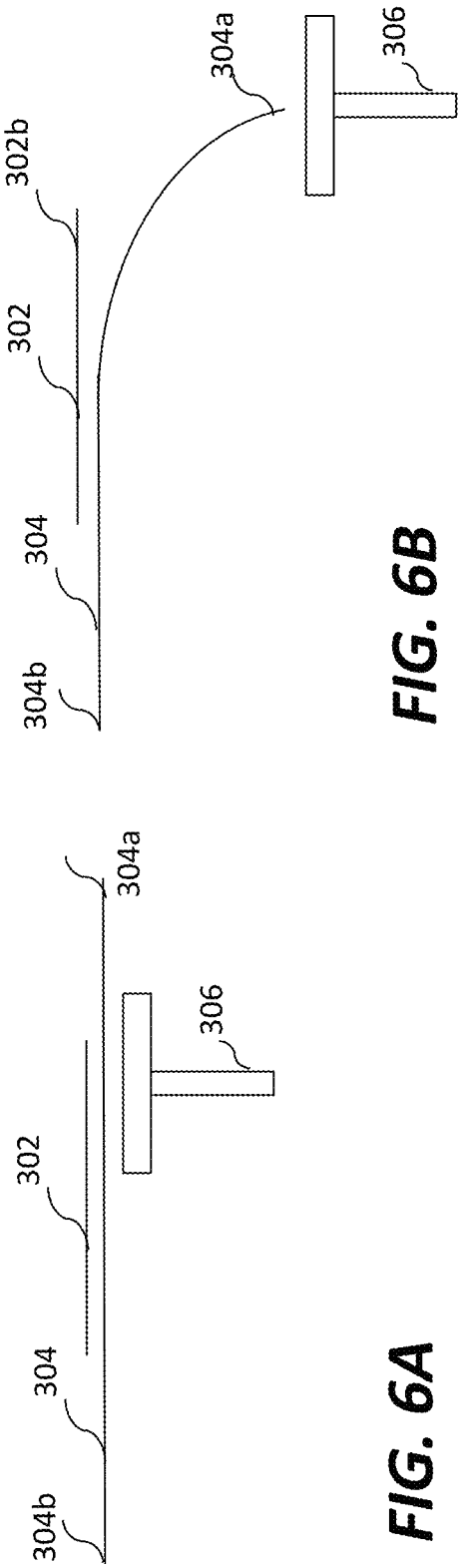
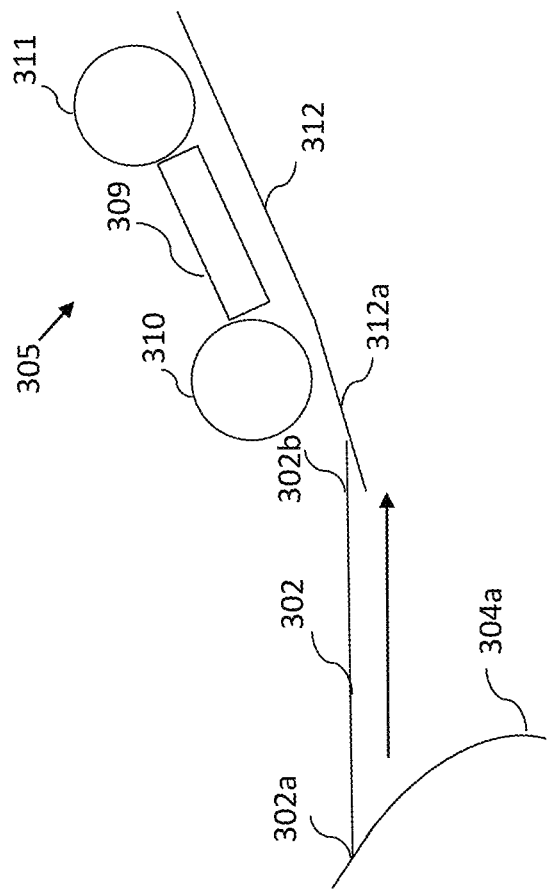
FIG. 6A
FIG. 6B
FIG. 6C

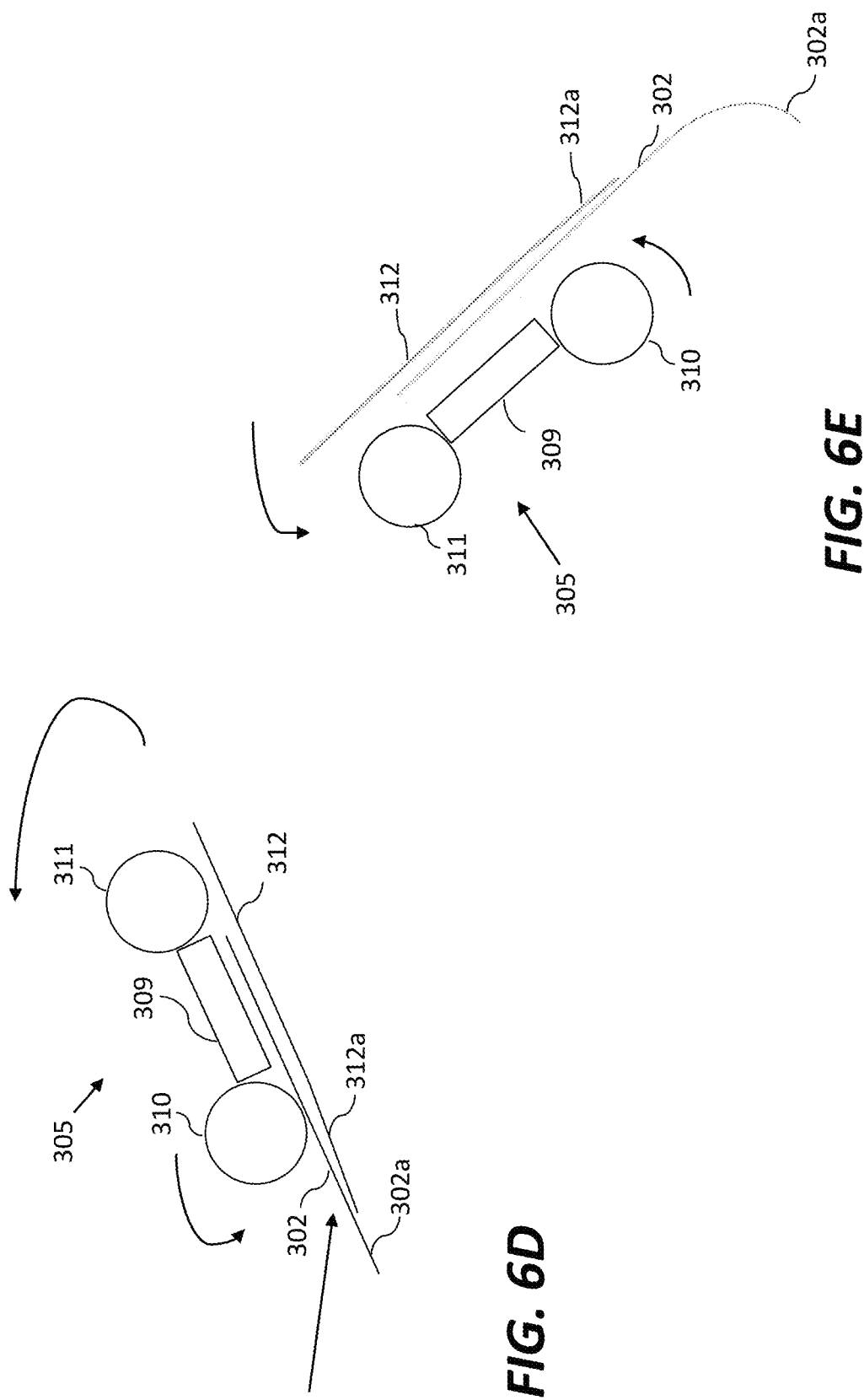

AUTOMATED RUNNING OF IMAGE-PROCESSING INSTRUCTIONS FROM STICKY NOTES

BACKGROUND

Technical Field

The present disclosure relates to electric digital-data processing of image data captured from documents, and to handling of thin material sheets to which detachable components are adhered, and more particularly relates to electronically scanning information from removable note sheets attached to documents, and utilizing the scanned information as it pertains to processing operations concerning the document.

Description of the Related Art

Paper documents are still the medium of choice for conveying and sharing information in many professional situations, whether it be for reasons of readability, security, freedom from device-dependence, or for any number of other reasons. Paper documents are often reviewed by those with an interest in the content of the document, who may accordingly write comments in reference to the document on removable note sheets they stick to the information-containing side of a given page or pages of the document. An example of such note sheets is paper notes with a self-adhesive strip such as the well-known POST-IT® notes. Such notes will be referred to as "sticky notes" hereinafter.

Sticky notes may be used to make printing-, scanning-, and copying-job requests related to a document. For example, a requester may write on a sticky note "Generate two photocopies of this document," and attach the sticky note to the document. As another example, a requester may write on a sticky note "Scan this document as a PDF file, and send it to <felicia@email.com> in marketing." Conventionally, to carry out such a request written on a sticky note, an MFP (multi-function peripheral/product/printer) user removes the sticky note and carries out the job requests using the MFP.

There are any number of document-processing situations where copying, storage, distribution, and similar operations carried out on single-page and multipage printed documents, individually and in sets, are handled according to specific document-targeted instructions written on sticky notes. New-hire and payroll processing, invoice processing, hospital records processing, processing of certain bank documents, legal discovery, and bibliographical data-based archiving of documents, for example, may involve review of the documents by specialists who prepare and append to given documents sticky notes containing specific, handwritten instructions for processing operations pertaining to the given documents, to be carried out by personnel other than the specialists.

Currently, such personnel must manually detach from a given document a sticky note containing such document-processing instructions, carry out the document-processing instructions the note contains, and in some instances reattach the note to the given document. This unautomated process is consequently laborious, time-consuming, and error-prone. These drawbacks are exacerbated in situations, such as described above, entailing the sticky-note based processing of a large volume of documents. In business-process outsourcing situations in which back-office processes involving documents with process-instructing sticky notes are outsourced to a provider, the document-processing personnel being at the provider company, not the outsourcing company, adds a degree of removal from the source of the document-processing instructions, compounding the likelihood of errors and the difficulty of correcting them.

While technology using optical character recognition (OCR) to acquire metadata from scanned handwritten notes is known, utilizing such technology to acquire and execute document-processing commands on a sticky note attached to an original document to be processed according to the commands with the objective of automating the thus-directed document process is not. Currently, automated processing of documents with such sticky notes attached does no more than scan the sticky notes along with the document, irrespective of text or image information that may be present under the sticky note. Any executing of document-processing commands on sticky notes is at present dependent on human intervention.

SUMMARY

An object of the presently disclosed technology is in an MFP or like image forming apparatus to enable the automated running of document-processing commands written on sticky notes removably attached to documents processed by the image forming apparatus.

The presently disclosed technology automatically detaches such sticky notes from the documents, scans information written on the notes, retains the notes intact, automatically runs document-processing commands written on the notes, and optionally reattaches the notes to the documents.

According to an embodiment of the disclosure, there is provided a method for automatically running a command from a note detachably attached to a document, when the document is received by an image forming apparatus. The method includes scanning the document with the note, by a scanning unit of the image forming apparatus, automatically detaching the note from the document, by the scanning unit, scanning the detached document and the note separately, by the scanning unit, recognizing text written on the scanned note, by a text recognition module, extracting one or more commands from a database corresponding to the recognized text, and automatically running the one or more commands for executing one or more corresponding jobs on the detached document.

According to other embodiments of the presently disclosed technology, there is provided a system for automatically running a command from a note detachably attached to a document, when the document is received by an image forming apparatus, wherein the note is a sticky note with a self-adhesive strip. The system includes a memory to store one or more instructions, and a processor communicatively coupled to the memory. The processor is configured to execute the one or more instructions of the memory to enable the scanning unit to scan the document with the note, automatically detach the note from the document, and scan the detached document and the note separately, recognize text written on the scanned note using optical character recognition (OCR) technology, extract one or more commands from a database corresponding to the recognized text, and automatically run the one or more commands to execute one or more corresponding jobs on the detached document.

According to yet another embodiment of the presently disclosed technology, there is provided an image forming apparatus that includes an image forming unit, a central processing unit, an operation panel, and a memory. The image forming unit includes a printing unit, a copying unit, a scanning unit configured to receive a document with a note attached thereto, automatically detach the note from the document, and scan the detached document and the note separately, and a note processing unit configured to recognize text written on the scanned note, extract one or more commands from a database corresponding to the recognized text, and automatically run the one or more commands for executing one or more corresponding jobs on the detached document. The central processing unit is configured to control an operation of the image forming apparatus. The operation panel includes a user interface for receiving one or more user commands and instructions, and outputting one or more options for selection by the user, and the memory for storing one or more instructions for use by the central processing unit, and user information of one or more users.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 6A-6E are schematic sectional diagrams illustrating different stages of the scanning process performed by the scanning unit of FIGS. 1, 3 and 4;

DETAILED DESCRIPTION

Figure 1:
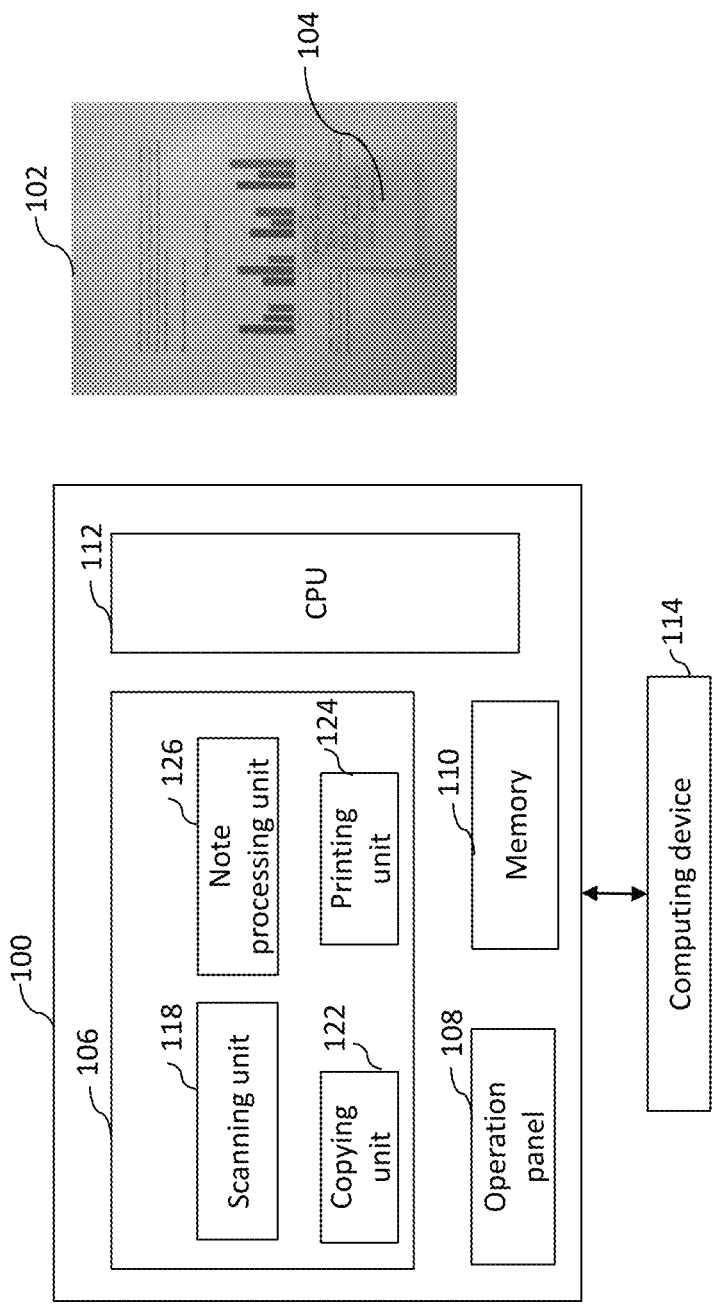
FIG. 1 is a block diagram of an image forming apparatus equipped with a scanning unit in accordance with embodiments of the presently disclosed technology, for scanning, in separate operations, a document and a detachable note ("sticky note") attached to the document and automatically running a command from the sticky note, wherein the figure includes an exemplary illustration of a document with an attached sticky note from which the image forming apparatus may run commands.

Example apparatus are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

FIG. 1 comprises a block diagram representing components and features, in accordance with embodiments of the presently disclosed technology, of an image forming apparatus 100 that in addition to functioning to scan a document 102 is enabled both to scan, separately from its scanning of the document 102, a sticky note 104 detachably attached to the document 102, and to run a command(s) written on the sticky note 104. The document 102 with its attached sticky note are also illustrated in the figure, which additionally represents a computing device 114, optionally linked to the image forming apparatus 100 for user access to and control of the image forming apparatus 100. An example of the sticky note 104 is a POST-IT® note or similar paper note with a self-adhesive strip. Hereinafter the sticky note 104 will be referred to simply as "note 104."

The image forming apparatus 100 includes an image forming unit 106, an operation panel 108, a memory 110, and a central processing unit (CPU) 112. The user computing device 114 may be connected to the image forming apparatus 100 either through a wired connection, or through a wireless communication network. Examples of the user computing device 114 includes a smartphone, a personal computer, a laptop, and the like. The user computing device 114 enables the user/operator to view the scanned documents, give scanning commands, and provide scanning preferences.

The image forming unit 106 includes a scanning unit 118, a copying unit 122, a printing unit 124, and a note processing unit 126. The imaging forming unit 106 may be hereinafter also referred to as a Multi-Function Peripheral (MFP), as it provides the functions of scanning, copying and printing. Other functions, such as facsimile functions, may also be included, and one or more functions may be excluded, as well. As will later be described in detail, in certain embodiments of the presently disclosed technology the scanning unit 118 is configured to automatically detach a note sheet from a document, and separately scan the detached note sheet as well as the document; the copying unit 122 is configured to generate one or more copies of a given document; and the printing unit 124 is configured to generate one or more print copies of a digital file. The note processing unit 126 is configured to process written information present on the note 104 and in response to the processed information, automatically perform one or more operations on a document. Examples of the one or more operations include, but are not limited to, scanning the document, printing a digital file, copying the document, changing the format of the scanned document, and emailing the scanned document to a designated email address.

The note processing unit 126 may include one or more individual processors, processing devices and various elements of a computer system associated with a processing device that may be shared by other processing devices. Additionally, one or more individual processors, processing devices, and elements may be arranged in various architectures for responding to and automatically processing the information on the scanned note, and executing one or more actions based on the processed information.

The operation panel 108 is a user interface for the image forming apparatus 100 and may take the form of a physical keypad or touchscreen. The operation panel 108 may receive inputs from one or more users relating to selected functions, preferences, and/or authentication, and may provide and/or receive inputs visually and/or audibly.

The CPU 112 is a processor, computer, microcontroller, or other circuitry that controls the operations of various components such as the image forming unit 106, the operation panel 108, and the memory 110. The CPU 112 may execute software, firmware, and/or other instructions, for example, that are stored on a volatile or non-volatile memory, such as the memory 110, or otherwise provided to the CPU 112. The CPU 112 may be connected to the image forming unit 106, the operation panel 108, and the memory 110, through wired or wireless connections, such as one or more system buses, cables, or other interfaces.

The memory 110, in addition to storing instructions and/or data for use by the CPU 112 in managing operation of the image forming apparatus 100, may also include user information associated with one or more users of the image forming apparatus 100. For example, the user information may include authentication information (e.g. username/password pairs), user preferences, and other user-specific information. The CPU 112 may access this data to assist in providing control functions (e.g. transmitting and/or receiving one or more control signals) related to operation of the image forming unit 106.

In operating the scanning unit 118, a user places the document 102 with the note 104 either on a platen glass of the scanning unit 118, or in a document feeder of the scanning unit 118. In some embodiments, the operation panel 108 may be configured to ask the user upon detection of the document 102, by suitably disposed, not-illustrated sensor(s) operatively connected to a below-described scanning control unit 308, "Document(s) include sticky note(s)?" In similar but alternative embodiments, the operation panel 108 may include a <Sticky Note> icon, which the user may press to receive options regarding scanning of the note 104.

Therein, as well as in implementations without the just-described detecting of document presence and operation-panel-based querying of a user, the scanning unit 118 is configured to scan the document 102 with the note 104, and either save a scanned copy of scanned-document data in the memory 110, or send it to the computing device 114. The scanning control unit 308 is configured to carry out a process of determining the position of the note 104 in the scanned document 102 based on the scanned-document data, but this process may at the same time serve to detect presence of the note 102 on the document 104. That is, in certain implementations of the presently disclosed technology, the process of detecting the position of the note relative to the document is achieved through an OCR analysis of the scanned-document data. Not only the relative location, but the presence itself, of the rectangular form of the note may be determined, for example, by recognition of a contrast in hue between the area that the note occupies, and the surrounding region of the document. Nevertheless, this detecting of position of the note 104 may be executed upon the scanning control unit 308 receiving advance user affirmation that a sticky note is present on the document 102.

Furthermore therein, the image forming apparatus 100 may be configured to have the operation panel 108 then ask the user "Scan note(s) separately from document(s)?" In addition, the image forming apparatus 100 may be further configured to have the operation panel 108 ask the user "Process sticky notes for running note commands?" As will be described below, the scanning unit 118 is enabled to detach the note 104 from the document 102, and scan the detached note 104 separately from the document 102. The carrying out of this function by the scanning unit 118 may be made conditional on the user saying "yes" to the query just mentioned.

The note processing unit 126 is configured to thereafter recognize any text written on the note 104, extract one or more command instructions from the recognized text, and automatically run the extracted commands to perform one or more functions of the image forming unit 106. To give an example, the note 104 might include handwritten information contains the instructions "Make 2 b/w copies of the document 102, create a PDF file with file name 'Farmer's Report,' and email the PDF file to <yourname@email.com>." In response to the note 104 including such command instructions, the note processing unit 126 effectuates the copying unit 122 creating two copies of the document 102, and effectuates the CPU 112 creating a PDF file of the document 102 with a predefined file name and email the PDF file to a designated email address.

The image forming apparatus 100 may be configured to have the operation panel 108 display "Reattach note to document?" as an interactive user query when the image forming apparatus 100 has completed processing of written information on the note 104. As will additionally be described below, the scanning unit 118 is enabled to reattach the note 104 to the document 102 at the original position of the note 104 on the document 102. The carrying out of this function by the scanning unit 118 may be made conditional on the user saying "yes" to the query just mentioned.

Figure 2:
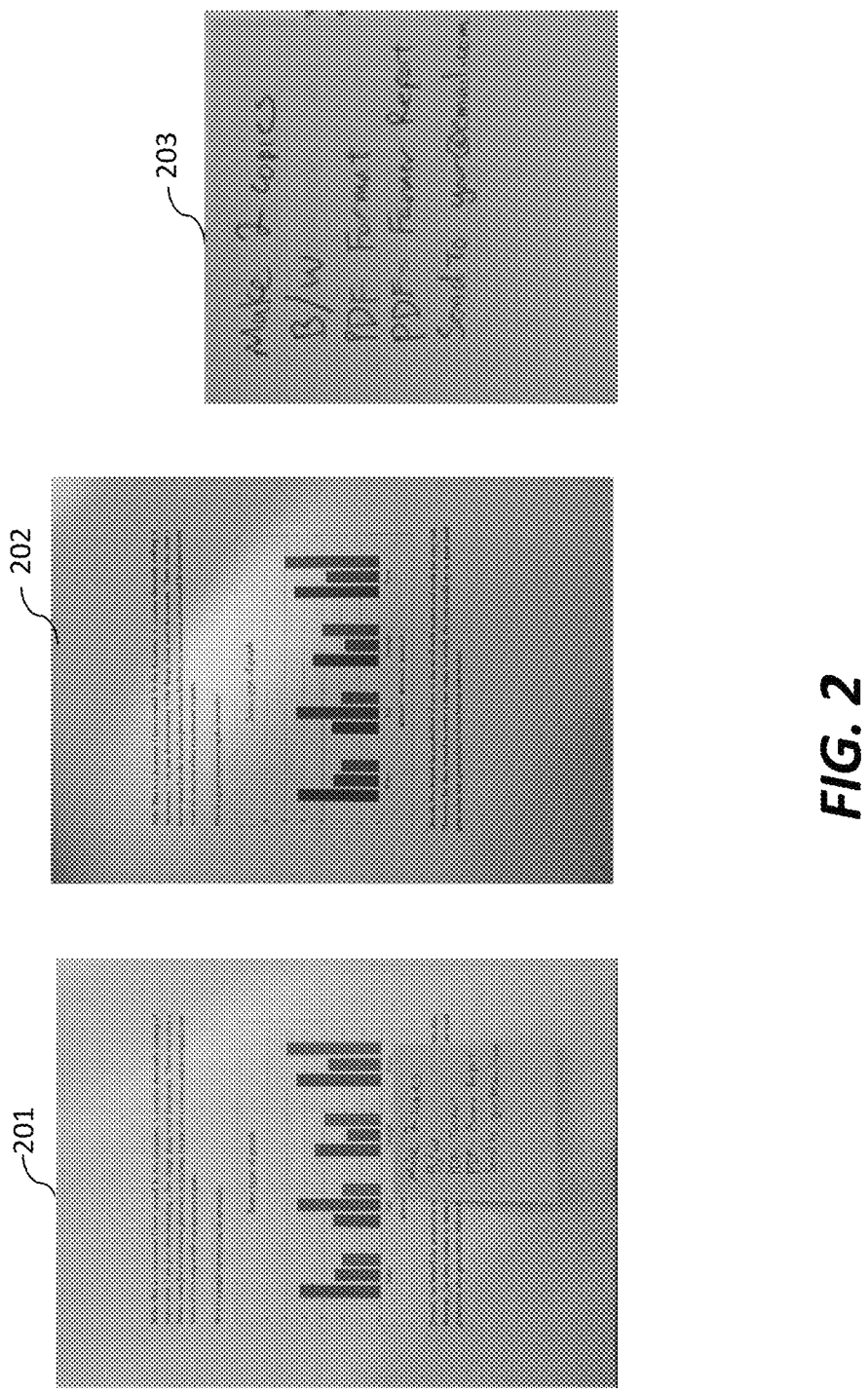
FIG. 2 depicts three images resulting from the scanning unit of FIG. 1 scanning the document with an attached sticky note of FIG. 1 in different scanning operations.

FIG. 2 illustrates first, second and third scanned documents 201, 202, and 203, scanned by the scanning unit 118, and either saved in the memory 110, or in a memory of the computing device 114. The first, second and third documents 201, 202, and 203 may be of format such as PDF, typical for image data output from scanners, or may be OCR-converted into a DOC or other text file. As illustrated, the first scanned file 201 is obtained by scanning the document 102 with the note 104, the second scanned document 202 is obtained by scanning only the document 102, and the third scanned file 203 is obtained by scanning only the note 104. The third scanned file 203 as illustrated includes the command instructions "Make 2 copies b/w, PDF format, PDF=Farmer's Report, send to yourname@email.com," for the execution of corresponding operations on the scanned document 203.

Figure 3:
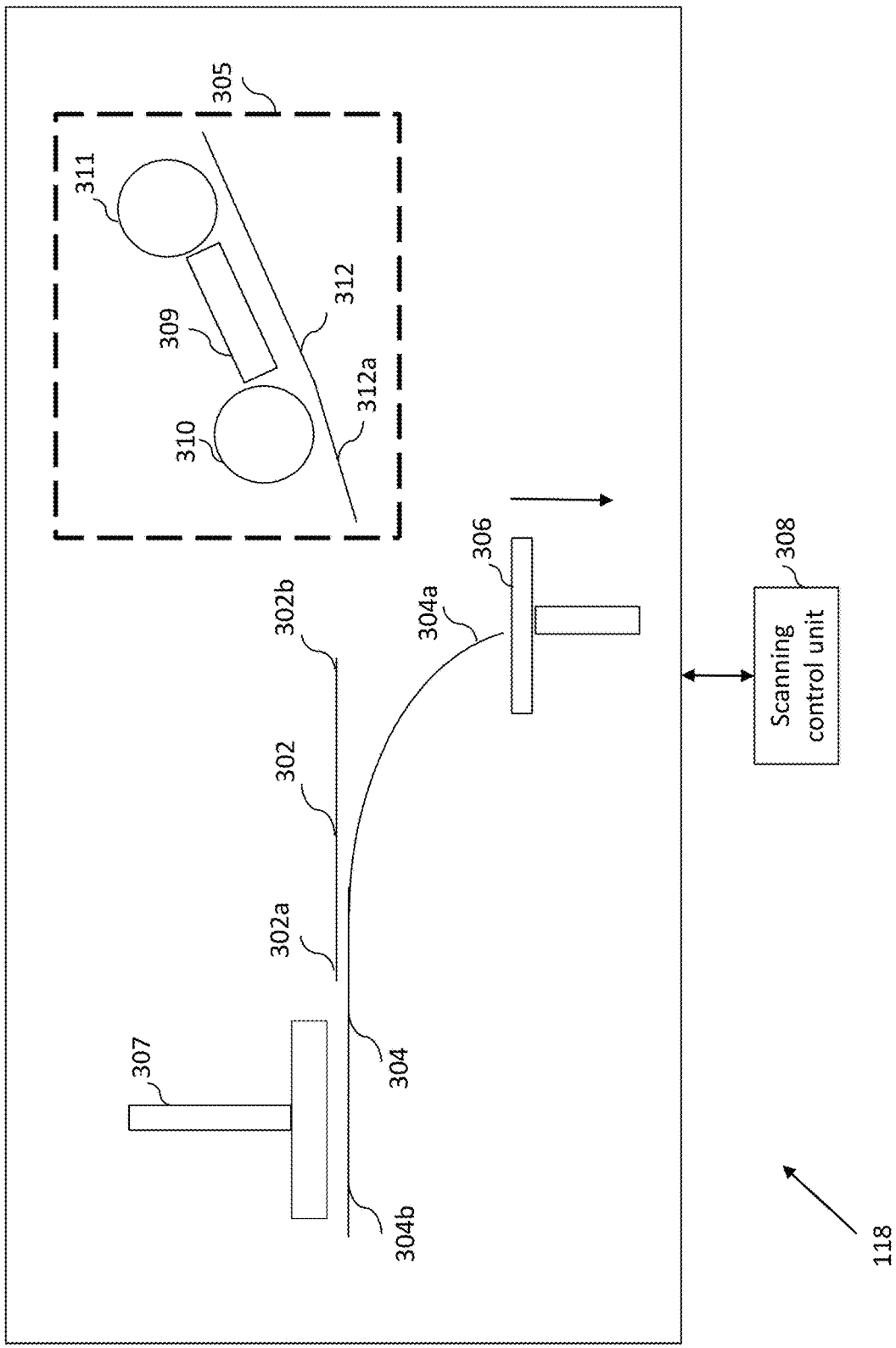
FIG. 3 is a sectional diagram schematically representing features of the scanning unit, including a document-edge bearing device, a document restraining assembly, and a pivotal scanning device, as functioning to process a sticky note attached to a document.

FIG. 3 illustrates details of the scanning unit 118 for processing a scanning-object note 302 (simply "note 302" hereinafter) detachably attached to a scanning-object document 304 (simply "document 304" hereinafter), in accordance with an embodiment of the presently disclosed technology. The edge of the note 302 detachably attached to the document 304 is an adhesive edge 302a, which is on the opposite end of the remaining, non-adhesive portion of the note 302 from what is herein termed its free edge 302b.

The scanning unit 118 includes a pivotal scanning device 305, a document-edge bearing device 306 abutting on a first end 304a of the document 304, and a document restraining assembly 307 pressing a second end 304b of the document 304 against a not-shown document-carrying table. It should be understood that the document-carrying table may be the platen-glass component itself of the scanning unit 118, in which case the platen-glass/document-carrying table is elevatable to allow the document-edge bearing device 306 to carry out its below-described function. Otherwise, the document-carrying table is separate from the platen glass, in which case the document-carrying table may be provided endwise-adjacent to the platen glass, document-feed flow downstream from the platen glass. In either case, the document 304 is fed on to the document-carrying table itself or onto the combined platen-glass/document-carrying table by a known document-feeding mechanism commonly employed in automatic document feeders in MFPs. As indicated in FIG. 3, the scanning unit 118 further includes a scanning control unit 308 for controlling the operations of the pivotal scanning device 305, the document-edge bearing device 306, and the document restraining assembly 307. The scanning control unit 308 may be the above-described CPU 112 executing software, firmware, and/or other instructions, either stored in the memory 110 or in a computer-readable recording medium, dedicated to carrying out scanning unit 118 control functions and algorithms described below. Alternatively, the scanning control unit 308 may be a separate computer processor executing software, firmware, and/or other instructions, either stored in a not-illustrated memory or in a computer-readable recording medium, dedicated to preconfigured to carry out the below-described scanning unit 118 control functions and algorithms.

As noted earlier, the scanning control unit 308 is operatively linked to appropriately disposed sensors (not illustrated), wherein the scanning control unit 308 is enabled for detecting presence of a document on the platen glass. It will be appreciated that thus, the scanning control unit 308 is likewise enabled for detecting presence of a document on the document-carrying table, if separate from the platen glass.

Figure 4:
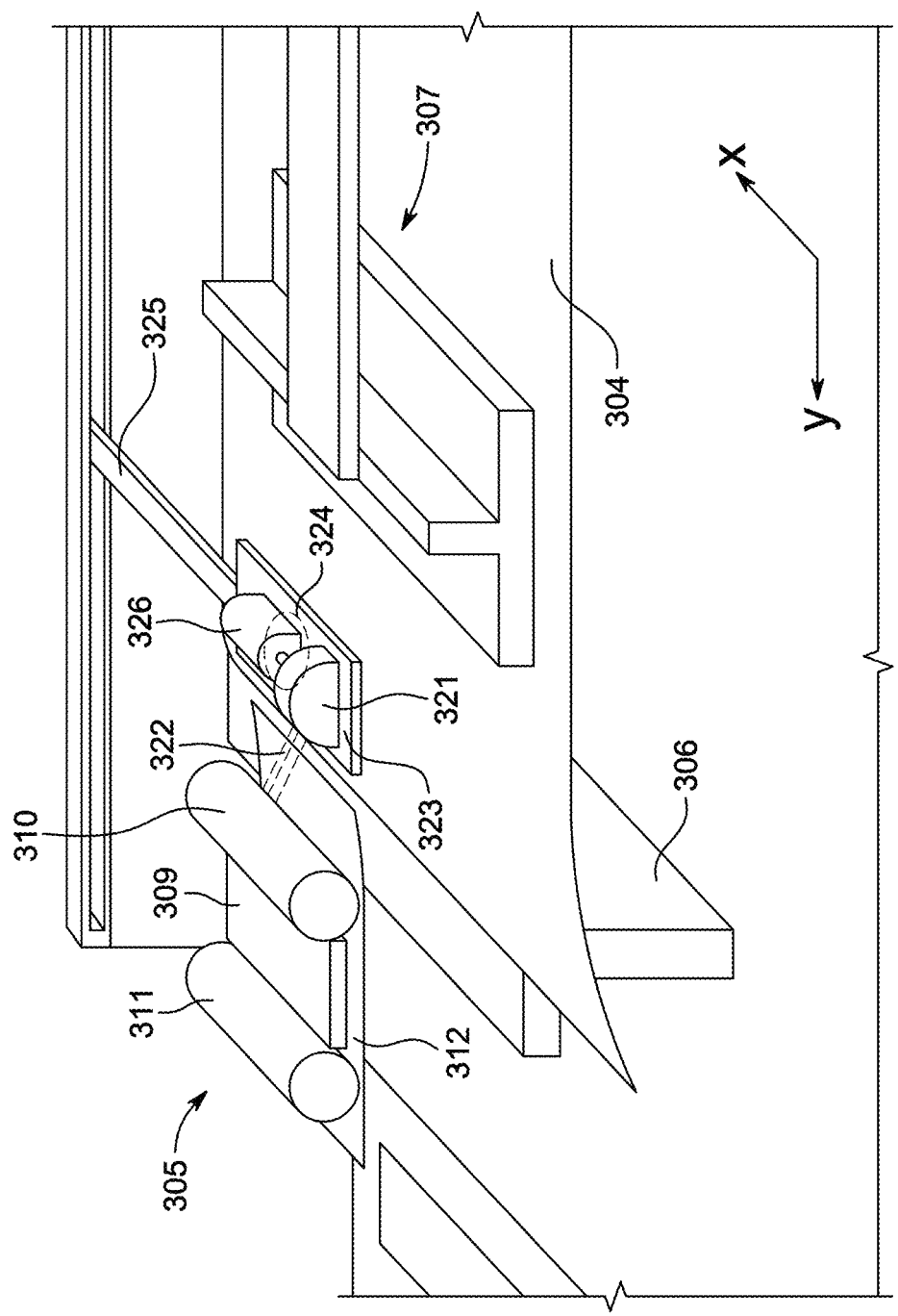
FIG. 4 is an isometric view of the scanning unit, in place over the scanning area of an MFP, scanner, printer, or the like as an image forming apparatus, including the pivotal scanning device with associated positioning and pivoting mechanisms and with the document-edge bearing device and document restraining assembly, in operation over, as received in the scanning unit, a document from which the pivotal scanning device removes and scans a not-shown sticky note.

As illustrated in FIG. 4, the pivotal scanning device 305 is mounted on a support arm 322 retained in a scanning mount 321 to pivot in a plane perpendicular to the plane of the document being scanned. The mount 321 is disposed on a note-targeting platform 323 that is carried on a swivel fixture 324 linked to a support arm 325 that is translatable widthwise and lengthwise with respect to the document. The swivel fixture 324 is swiveled, and the support arm 325 is translated, within a plane parallel to the document being scanned by, respectively, a not-shown stepper motor and a not-shown rack-and-pinion, servomotor-driven support-arm translating mechanism, both of which are controlled by the scanning control unit 308 in response either to detection information obtained by the scanning control unit 308 from an advance scanning of the document 304 by scanning hardware beneath the platen glass or combined platen-glass/document-carrying table, as described further below, or to detection information received from a later-described sensor 410. A pivot-drive motor 326 which in some implementations may be a stepper motor, and in other implementations may be a servomotor, drives the support arm 322 to pivot the pivotal scanning device 305, while the swivel fixture 324 includes a not-shown stepper motor to swivel the note-targeting platform 323 within a range of up to 180 degrees in the plane of the note-targeting platform 323. The pivot-drive motor 326, the support-arm translating mechanism for translating the support arm 325, and the stepper motor driving the swivel fixture 324 are control-operatively linked to the scanning control unit 308. It will be appreciated that thus, the pivotal scanning device 305 is situatable into any (x, y) position with respect to the document 304 along its widthwise x and lengthwise y directions.

The pivotal scanning device 305 includes a note-sheet scanner 309, first and second rollers 310 and 311 rotatably disposed on opposing lateral sides of the note-sheet scanner 309, and a note-wedging guide 312, coated with silicone or other slippery (non-stick) coating, beneath the note-sheet scanner 309. The note-wedging guide 312 may have an upturned or bent leading edge 312a to assist in the guide being slid under the free edge 302b of the note 302. In certain embodiments of the scanning unit 118, the note-sheet scanner 309 is an auxiliary part of a sheet-fed scanning system that, similarly to conventional scanners, is configured by scanning hardware together with control functionality, executed by the scanning control unit 308 for example, to irradiate a document placed on the platen glass or combined platen-glass/document-carrying table with scanning light from a light source, optically read the document based on the reflected light, and convert the optical image into an electric signal, thereby generating imaging data for digitalized reproduction of the document. In such embodiments, accordingly, the position of the note 302 on the document 304 may be determined based on a copy of the document 304 scanned conventionally in advance, with the note 302 attached. This OCR-based method of determining the location of the note 302 relative to the document 304 is described hereinabove. In these implementations of the scanning unit 118, the controlling by the scanning control unit 308 of the not-shown stepper motor to swivel the swivel fixture 324 and of the not-shown rack-and-pinion, servomotor-driven support-arm translating mechanism to translate the support arm 325 is carried out based on such detection information obtained from the digitalized reproduction of the document obtained by its aforementioned advance, conventional scanning. The scanning unit 118 of such embodiments preferably is configured with the aforementioned elevatable combined platen-glass/document-carrying table, with the note-targeting platform 323 on its x-y translatable support arm 325 and the pivotal scanning device 305 that the note-targeting platform 323 carries being disposed over the platen-glass/document-carrying table.

The document-edge bearing device 306 is configured to drop perpendicularly away from the first edge 304a of the document 304 to allow the first edge 304a to droop under its own weight, and the document restraining assembly 307 is configured to keep the second edge 304b of the document 304 in a flat position. It will be understood that the first and second edges 304a and 304b in the FIG. 3 illustration are the longitudinal ends of the document 304, wherein the first edge 304a is relatively nearer the free edge 302b, and the second edge 304b is relatively nearer the adhesive edge 302a. The first edge 304a of the document 304 drooping under its own weight opens a gap between the free edge 302b of the note 302 and the document 304, exposing the free edge 302b.

The first and second rollers 310 and 311 are rotated at predetermined speeds in a first direction (either clockwise or counterclockwise) and in a second, opposite direction (either counterclockwise or clockwise) to draw the note 302 across the note-sheet scanner 309. For example, a not-shown drive train linked to a not-shown motor on the note-wedging guide 312 may be employed to rotate the rollers 312 accordingly. In the presently described embodiment, the scanning control unit 308 is configured to control the speed and direction of rotation of the first and second rollers 310 and 311. The scanning control unit 308 thus controlling the direction and speed of the first and second rollers 310 and 311 enables the pivotal scanning device 305 to catch the free edge 302b, and draw the note 302 towards the note-sheet scanner 309, once the note-targeting platform 323 carrying the pivotal scanning device 305 has been situated into position over the note 302, as will be explained below.

Although the herein-described pivotal scanning device 305 has only two rollers 310 and 311, as will be apparent to one of ordinary skill in the art, more than two rollers may be employed to facilitate moving the note 302 across the note-sheet scanner 309 to carry out the scanning process. The note-wedging guide 312 is a plate whose roller-opposing surface may be coated with a sprayed- or painted-on membrane of silicone, or may be Teflon® coated or similarly surface-treated so that the adhesive edge 302a of the note 302 won't stick to the note-wedging guide 312.

Figure 5:
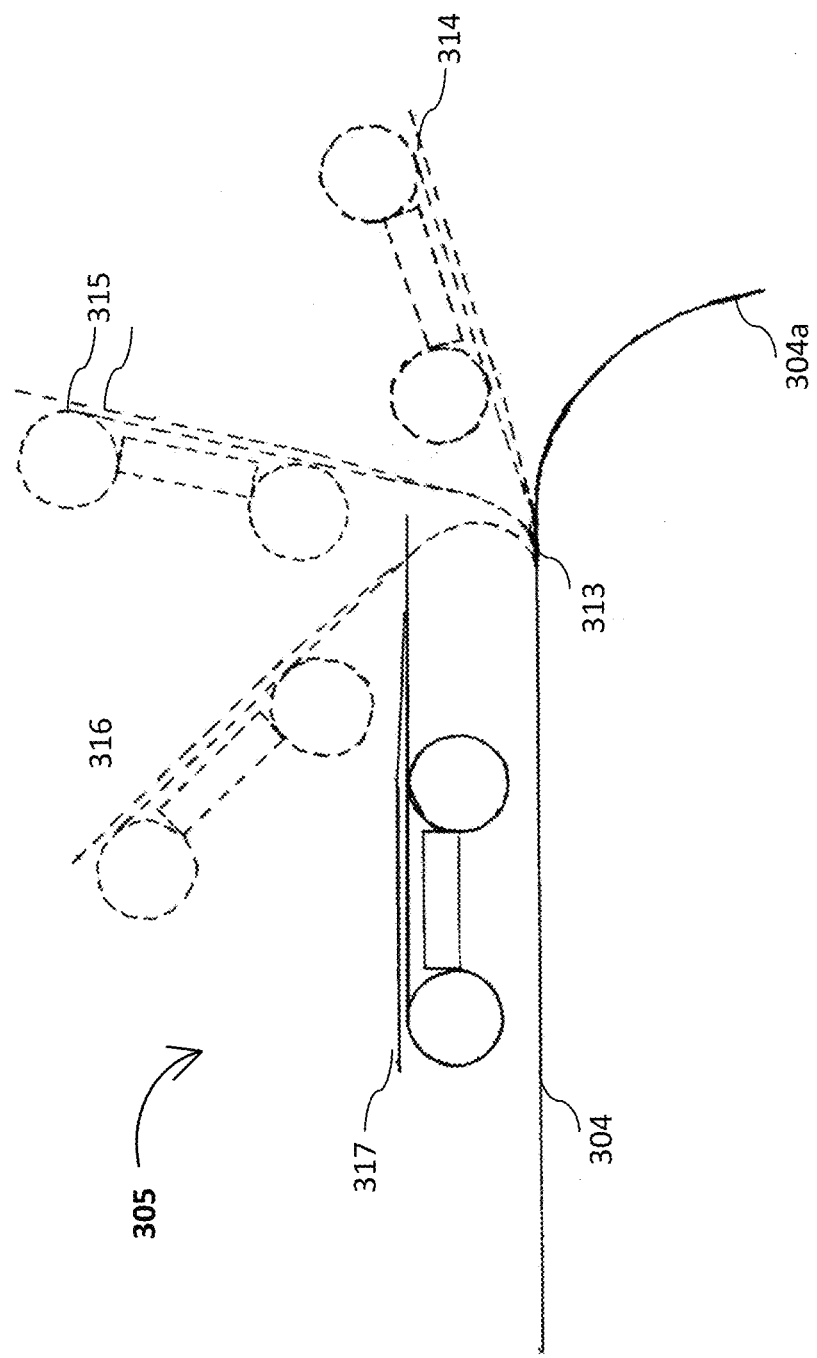
FIG. 5 is a sectional view illustrating the scanning-unit pivotal scanning device of FIGS. 3 and 4, pivoting in stages as it removes a not-shown sticky note.

FIG. 5 schematically depicts the pivotal scanning device 305 in accordance with embodiment of the presently disclosed technology in stages of pivoting from having caught the free edge 302b of the note 302, through to having been turned upside-down to peel the note's adhesive edge 302a off of the document 304. In implementations in which the pivot-drive motor 326 is a stepper motor, the motor 326 is controlled by the scanning control unit 308 to pivot the support arm 322, and thus the pivotal scanning device 305 as a whole, around a pivot point 313 in stepwise fashion, for example, first through fourth positions 314 to 317. In implementations in which the pivot-drive motor 326 is a servomotor, the motor 326 is controlled by the scanning control unit 308 to pivot the scanning apparatus 305 continuously rather than stepwise. In either case, the scanning control unit 308 is configured to control the pivot-drive motor 326 appropriately so as to pivot the pivotal scanning device 305 from the sticky-note free-edge engaging position, to the sticky-note removal position where the pivotal scanning device 305 is flipped over.

In its first, or resting, position 314 the pivotal scanning device 305 is manipulated so as to wedge the note-wedging guide 312 under the free edge 302b of the sticky note 302. In its fourth, or scanning-operational, position 317 the pivotal scanning device 305 is inverted, wherein it has peeled the sticky note 302 completely off the document 304 and wherein the scanning control unit 308 drives the first and second rollers 310 and 311 to draw the sticky note 302 over a not-shown scanning window in the note-sheet scanner 309 to optically scan text and/or graphic information from the note 302. Accordingly, the scanning unit 118 is configured to rotate the pivotal scanning device 305 in a direction away from the first edge 304a of the document 304 to swing from the first position 314 to the fourth position 317, and further to rotate in a direction towards the first edge 304a to swing from the fourth position 317 to the first position 314.

In operation, when the document 304 is submitted for the scanning, the first edge 304a is in a flat position (FIG. 6A), and the scanning control unit 308 enables scanning of the document 304 with the note 302. When the user provides their affirmation regarding presence of a sticky note 302 on the document 304, and scanning of the sticky note 302 and the document 304 individually, the scanning control unit 308 enables lowering down of the document-edge bearing device 306 (FIG. 6B) based on a position of the note 302 on the document 304. As explained earlier, movement of the document-edge bearing device 306 perpendicularly away from the first edge 304a of the document 304 allows the first edge 304a to droop. The first edge 304a thereby curves off the document 304, exposing the free edge 302b of the note 302.

Referring to FIG. 6C, the scanning control unit 308 is configured to push the document 304 towards the first roller 310, such that only the free edge 302b comes into contact with the first roller 306 due to curved position of the first edge 304a. Herein, the pivotal scanning device 305 is shown to be in the first position 314 (FIG. 5), which may be termed its steady-state position.

FIG. 6D illustrates movement of the note 302 towards the note-sheet scanner 309 for the purpose of scanning. Herein, the first and second rollers 310 and 311 rotate about their axis counterclockwise, as depicted in the figure, to pull the note 302 under the note-sheet scanner 309 for scanning. In the present embodiment, as soon as the first and second rollers 310 and 311 start rotating to initiate scanning of the note 302, the pivoting scanning apparatus 305 also starts pivoting counterclockwise. In the illustrated example, the pivoting scanning apparatus 305 is shown, in FIG. 6D, to be on its way to the second position 315 of FIG. 5. FIG. 6E illustrates the pivotal scanning device 305 on its way from the third position 316 of FIG. 5, for detaching the adhesive edge 302a of the note 302 from the document 304. The counterclockwise pivoting of the scanning apparatus 305 and of the first and second rollers 310 and 311 provides a leveraging force that gently peels the adhesive edge 302a from the document 304, once the note 302 is caught between the rollers 310 and 311, and the note-wedging guide 312.

As the note 302 moves towards the second roller 311, it is also being simultaneously scanned by the note-sheet scanner 309. In some embodiments of the presently disclosed technology, after the scanning of the note 302 is completed, the document 304 may also be scanned independently by the note-sheet scanner 309.

Figure 7:
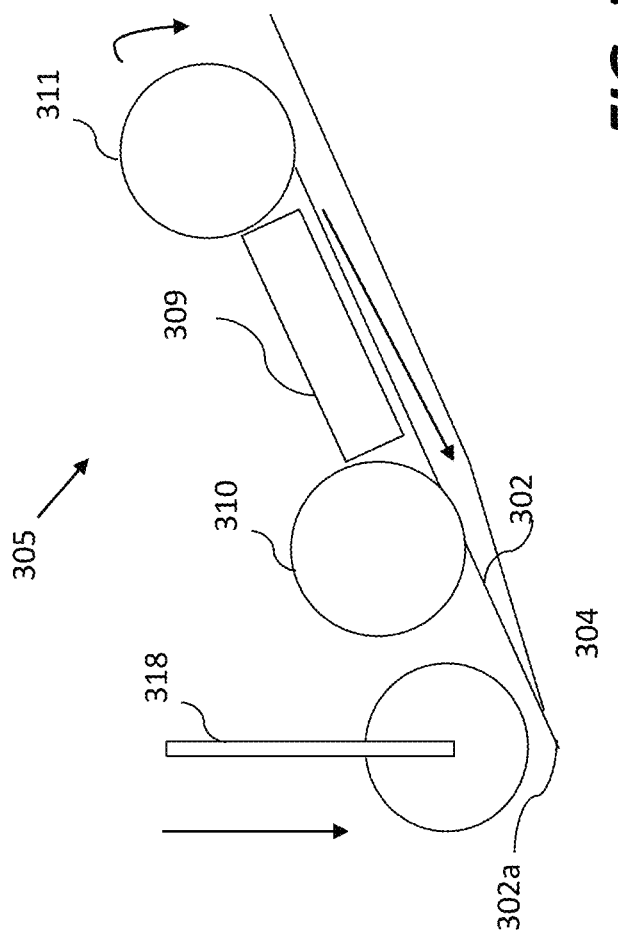
FIG. 7 is a schematic sectional diagram depicting a retractable presser roller in place to pressure-roll on the adhesive edge of a detached removable note being replaced into its original position on a document by the pivotal scanning device.

FIG. 7 illustrates reattachment of the note 302 to the document 304 after the scanning of the note 302 is completed, in accordance with certain embodiments of the presently disclosed technology. Herein, the pivotal scanning device 305 is shown to be in the first position 314 (FIG. 5), i.e. steady state position. In embodiments enabling a user to provide affirmation regarding reattaching of the note 302 to the document 304, the scanning control unit 308 directs the first and second rollers 310 and 311 to rotate in the rotational direction opposite from the first rotational direction, so as to push the note 302 away from the note-sheet scanner 309, and back towards its original position on the document 304. It will be appreciated that pivotal motion of the pivotal scanning device 305 does not take place during the reattachment of the note 302 to the document 304. In embodiments in which the scanning unit 118 is enabled for reattaching the note 302 to the document 304, the scanning unit 118 further includes a retractable presser roller 318 that for example is carried on a not-shown rack-and-pinion mechanism driven by a not-shown stepper motor or servomotor, to press the adhesive edge 302a of the note 302 onto the document 304 to reattach the note 302 to the document 304, when the note 302 arrives back at its original position on the document 304.

Thus, advantageous benefits the presently disclosed technology can achieve in various embodiments include any or all of: eliminating the need to remove the sticky note 302 from the document 304 manually, eliminating the need to scan the sticky note 302 manually, or eliminating the need to reattach the sticky note 302 to the document 304 manually after it has been removed.

In other embodiments, a scanning unit 118 of the present disclosure may employ a sticky note waste basket, if the user chooses to have the sticky note 302 removed permanently from the original document 304.

Figure 8:
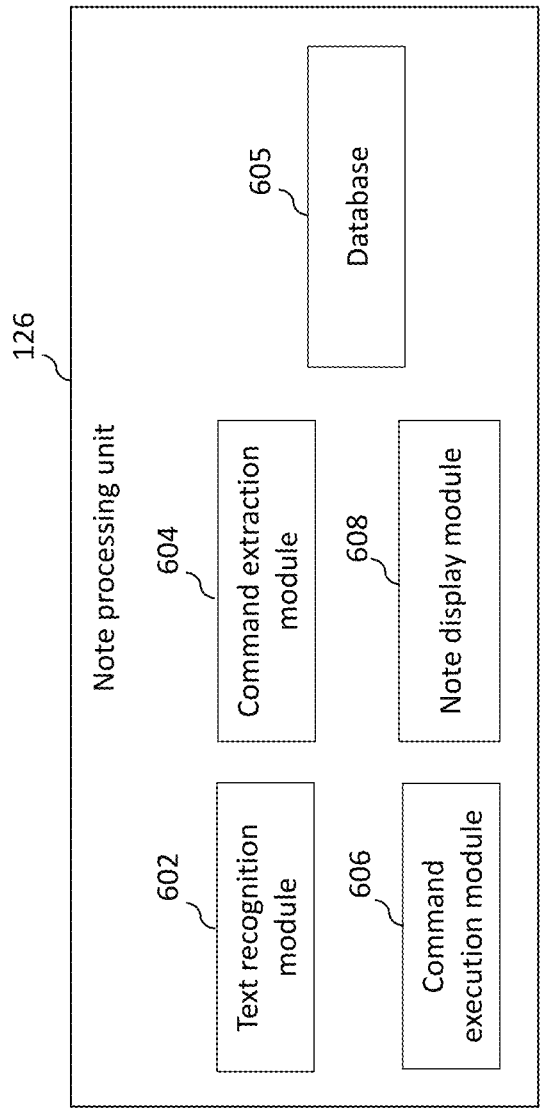
FIG. 8 illustrates the note processing unit in detail, in accordance with certain embodiments of the presently disclosed technology.

FIG. 8 illustrates the note processing unit 126 in detail, in accordance with certain embodiments of the presently disclosed technology.

The note processing unit 126 includes a text recognition module 602, a command extraction module 604, a database 605, a command execution module 606, and a note display module 608. In some embodiments, each of the five components 602 through 608 could exist on a single physical computer, or on more than one computer and communicate through messaging protocols. If the five components run on a single computer, they could run in separate processes that communicate by communication protocols. The components 602 through 608 may be implemented in a programming language. If they run within a single process, they may run as threads. In implementations where the five components run in a single process, they could be configured according to reactive-programming techniques, enabling the components to share one or more threads.

In certain embodiments of the presently disclosed technology, the text recognition module 602 is configured to receive a scanned-copy, data version of the note ("scanned note") 203, and recognize text in the scanned note 203 using optical character recognition (OCR) technology, wherein the scanned note may be in a document format such as PDF or an image format such as JPEG. In certain embodiments of the presently disclosed technology, the text recognition module 602 is configured to recognize one or more keyword strings from the scanned note 203.

The command extraction module 604 is configured to extract one or more commands from the preconfigured database engine 605 based on the OCR-recognized keyword strings. The database 605 constitutes a structured way of preserving data in memory or a storage space. Examples of the database include but are not limited to, SQL, MongoDB, PostGres, etc. In some implementations, the database 605 may include a lookup table of predefined keyword strings and commands. Keyword strings in the recognized text may be compared against commands in the database 605.

In a given example, if the keyword string is "make 2 copies B/W," the corresponding command might be "generate 2 black and white photocopies." Likewise, if the keyword string is "PDF format," the corresponding command might be "save the scanned file in a PDF format." If the keyword string is "PDF=Farmer's Report," the corresponding command might be "name the PDF file <Farmer's Report>," and if the keyword string is "send to <yourname@email.com>," the corresponding command might be "email the PDF document to yourname@email.com."

The command execution module 606 is configured to cause the image forming apparatus 100 to run the extracted commands and automatically start executing one or more operations on the detached document based on the commands written on the sticky note. In some implementations, the command execution module 606 effectuates the copying unit 122 (FIG. 1) automatically running the copying job to make two copies of the document 202 (FIG. 2), and effectuates the CPU 112 automatically saving the document 202 in a PDF format with file name Farmer's Report, either in the memory 110, or in a memory of the computing device 114, and then emailing the scanned file.

Thus, instead of a user manually removing the sticky note 104 to read the instructions for the job so as to input the corresponding operations, the note processing unit 126 is enabled to read commands on a sticky note after recognizing its command-containing text, and instruct the carrying out of corresponding job processes, without manual intervention by a user. This greatly saves time when processing large batch jobs.

The note display module 608 is configured to display the scanned note 203 on the user computing device 114. In certain embodiments of the presently disclosed technology, the note processing unit 126 is configured to add a hyperlink into the scanned note 203, such that when a user clicks on the hyperlink, the user is able to view an accordingly linked PDF or other-format file. The linked PDF file may be present in the database 605. In one example, the hyperlink may include the location of another PDF file. In another example, the hyperlink may include a search query command to apply to the database 605 so as to retrieve a different PDF file.

In other embodiments of the presently disclosed technology, the note display module 608 is configured to display the text of the scanned note 203 in a typed form in a predefined font, font color and font size.

In yet other embodiments of the presently disclosed technology, the note display module 608 is configured to display the text of the scanned note 203 in a language different from the original language of the recognized text.

In still other embodiments of the presently disclosed technology, the note processing unit 126 is enabled to read given special symbols or designs handwritten as commands on the original sticky note 104 once it has been converted into the scanned note 203. For example, the text recognition module 602 may be configured to treat a given geometric shape as a command to group multiple PDFs together, and send the corresponding command to the command execution module 606. This feature may be helpful in medical settings, where many documents can pertain to patient Jane Doe, but may not be in the same database—for example, x-ray, pharmacy, and lab-work documents for Jane Doe might be in different respective databases. In lieu of a special symbol or design, an especially shaped or colored sticky-note or sticker may be used to serve a similar purpose.

In similar implementations, the text recognition module 602 may be configured to recognize stickers of special form or color, or placed in a predetermined location on a document, and on that basis send a corresponding command to the command execution module 606 to have the image forming apparatus 100 to perform special operations. For example, a sticker's being placed in the lower left corner of a document could be predetermined to indicate a "Group multiple PDFs" command, in the upper right corner, a "Evenly split multipage document in two."

Figure 9:
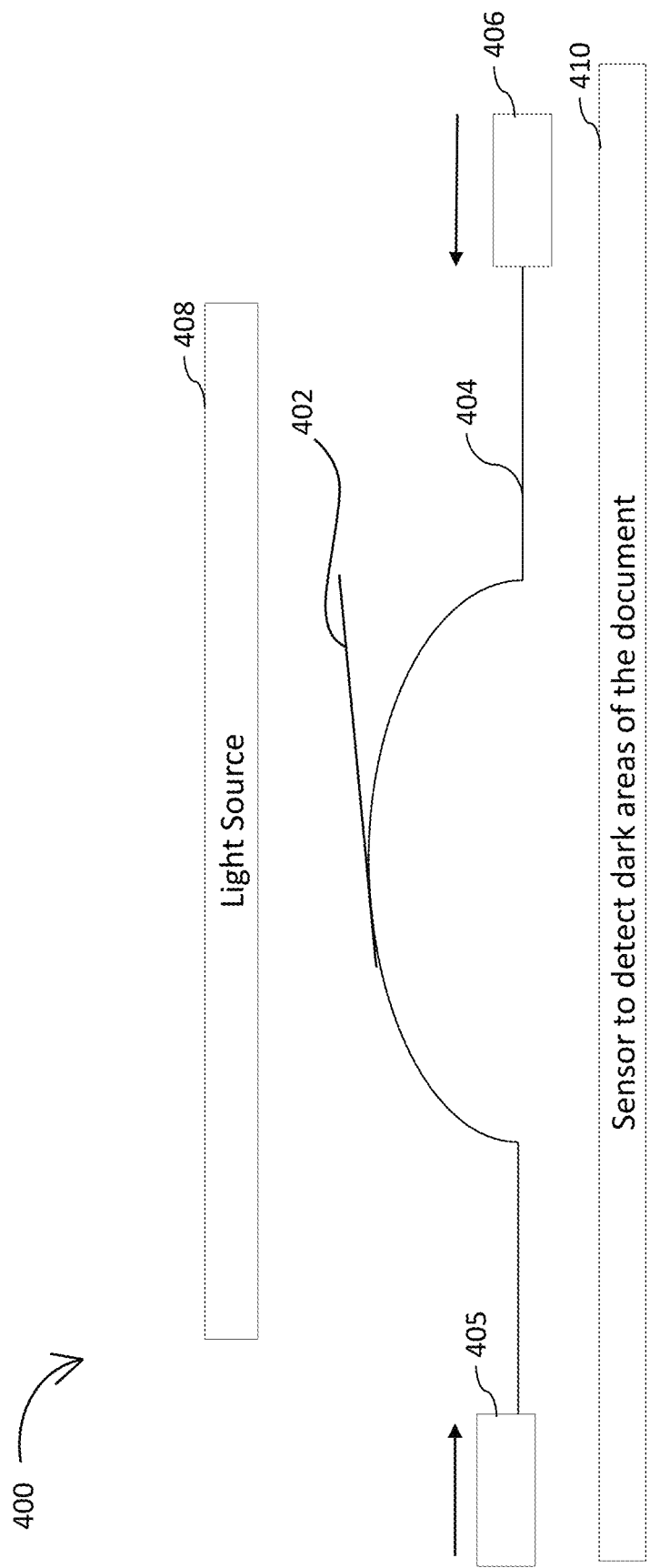
FIG. 9 schematically represents a note detection assembly for automatically detecting if a sticky note is physically present on a document, in accordance with certain embodiments of the presently disclosed technology.

FIG. 9 illustrates a note detection assembly 400 for distinguishing whether a note feature 402 on a document 404 is a physically separate note sheet or is a printed image (e.g., a photocopied sticky note) that is a graphical feature of the physical document 404. In certain embodiments of the presently disclosed technology, the note detection assembly 400 may be optionally added to the scanning unit 118, and operatively connect to, for being controlled by, the scanning control unit 308, for automatically distinguishing the type of note feature 402 on the document 404. In certain implementations as described above, the user may give affirmation regarding presence of a sticky note on the document 404. However, the note may not be a physical note, and may be a printed image of same. Thus, the note detection assembly 400 facilitates verification of user response regarding sticky note. The note detection assembly 400 may also facilitate automatic detection of the sticky note on the document, as soon as the document is submitted for scanning.

In certain embodiments of the presently disclosed technology, the note detection assembly 400, provided in a sheet-fed scanning system of configuration as described earlier, includes first and second sheet-wrinkling sliders 405 and 406 deployed at left and right sides of the platen glass, constituting a document-sheet wrinkling mechanism for sliding against the document 404 along its opposing left and right edges to wrinkle the document 404 so as to create an arch in it. When the note feature 402 is a physical note stuck on the document 404, then a gap will thus be created between the non-adhesive, free end of the note feature 402 and the region of the document 404 immediately beneath the free end. It will be appreciated that a single sheet-wrinkling slider unilaterally sliding the document against a diametrically opposing, stationary retainer could be employed as the document-sheet wrinkling mechanism to similar effect.

In some embodiments of the presently disclosed technology, the note detection assembly 400 further includes a light source 408 to cast light on the note feature 402, and a sensor 410 to determine the darkness of the shadow created by the free end of a physical note feature 402 having been arched by the first and second sheet-wrinkling sliders 405 and 406, although in other embodiments the light source 408 may be ambient light, such as light from a ceiling light fixture. By the sensor 410 sensing the darkness of the shadow created by the note feature 402, the note detection assembly 400 concludes whether the note feature 402 is a physical sticky note or a printed/photocopied image of a sticky note, and provides information to the scanning control unit 308 indicating the conclusion.

The sensor 410 may also function dually also to detect the position of the above-discussed note 302, or note feature 402 (when the note detection assembly 400 determines that the note feature 402 is a physical note), relative to the document 304/404. The sensor 410 in being control-operatively linked to the scanning control unit 308 can provide the scanning control unit 308 with information identifying the position of the note 302/402. Based on that information, the scanning control unit 308 controls the not-shown rack-and-pinion, servomotor-driven mechanisms to translate the support arm 325 so as to position the pivotal scanning device 305 widthwise and lengthwise with respect to the document into a location where the note-wedging guide 312 may be slid beneath the free edge 302*b* of the note 302/402, by appropriate further control of the support-arm translating mechanism by the scanning control unit 308. It will be appreciated that in lieu of the just-described dual functioning of the sensor 410, a separate sensor dedicated to detecting the position of the note 302/402 relative to the document 304/404 may be provided.

Figure 10:
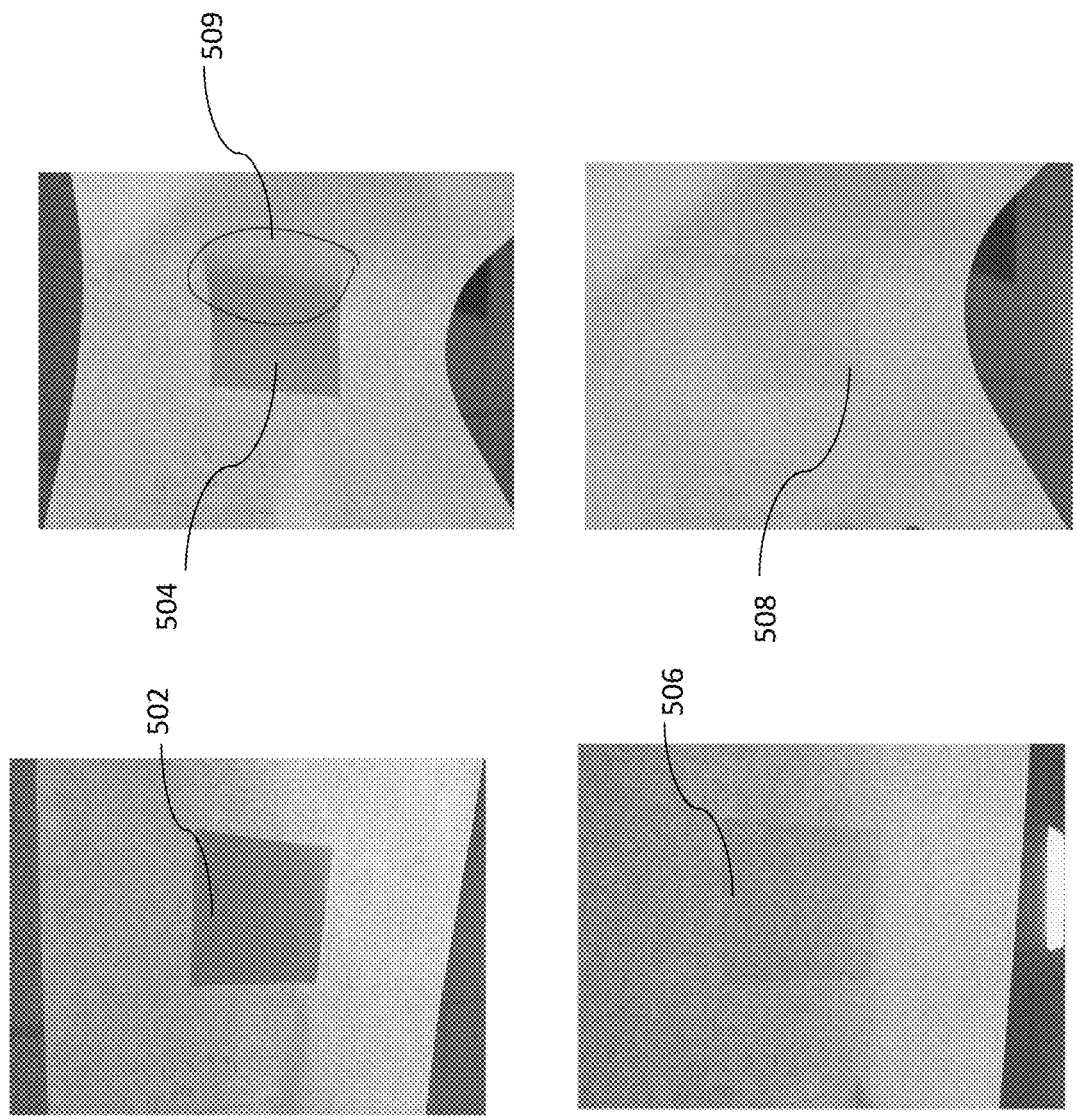
FIG. 10 presents images of physical and copied sticky notes generated by the note detection assembly before and after arching of a corresponding document.

FIG. 10 depicts two corresponding pairs of images of, respectively, a physical note and a printed/photocopied note, indicating the shadowing presented to the sensor 410 before and after arching of corresponding document using the first and second sheet-wrinkling sliders 405 and 406. In this example, first and second images 502 and 504 correspond to the physical sticky note before and after wrinkling of the document into an arch. On the other hand, third and fourth images 506 and 508 correspond to the printed/photocopied sticky note before and after wrinkling of the document into an arch. It can be seen that when the document 502 is arched, by the physical sticky note 504 diffuses a distinct amount of light, as distinct from the printed/photocopied sticky note 508, which does not diffuse any light. That is, the second image 504 includes a gray area 509 that is lighter relative to the shadow underneath, because the free end of the physical sticky note peeled off the wrinkle-arched document blocks out light, casting a shadow on the document around the free end. In contrast, in the fourth image 508, the printed/photocopied sticky note, being made of toner/ink, does not affect the amount of light being diffused. Thus, based on the light diffusion and shadow region, the sensor 410 can distinguish between physical and printed/photocopied sticky notes.

Figure 11A:
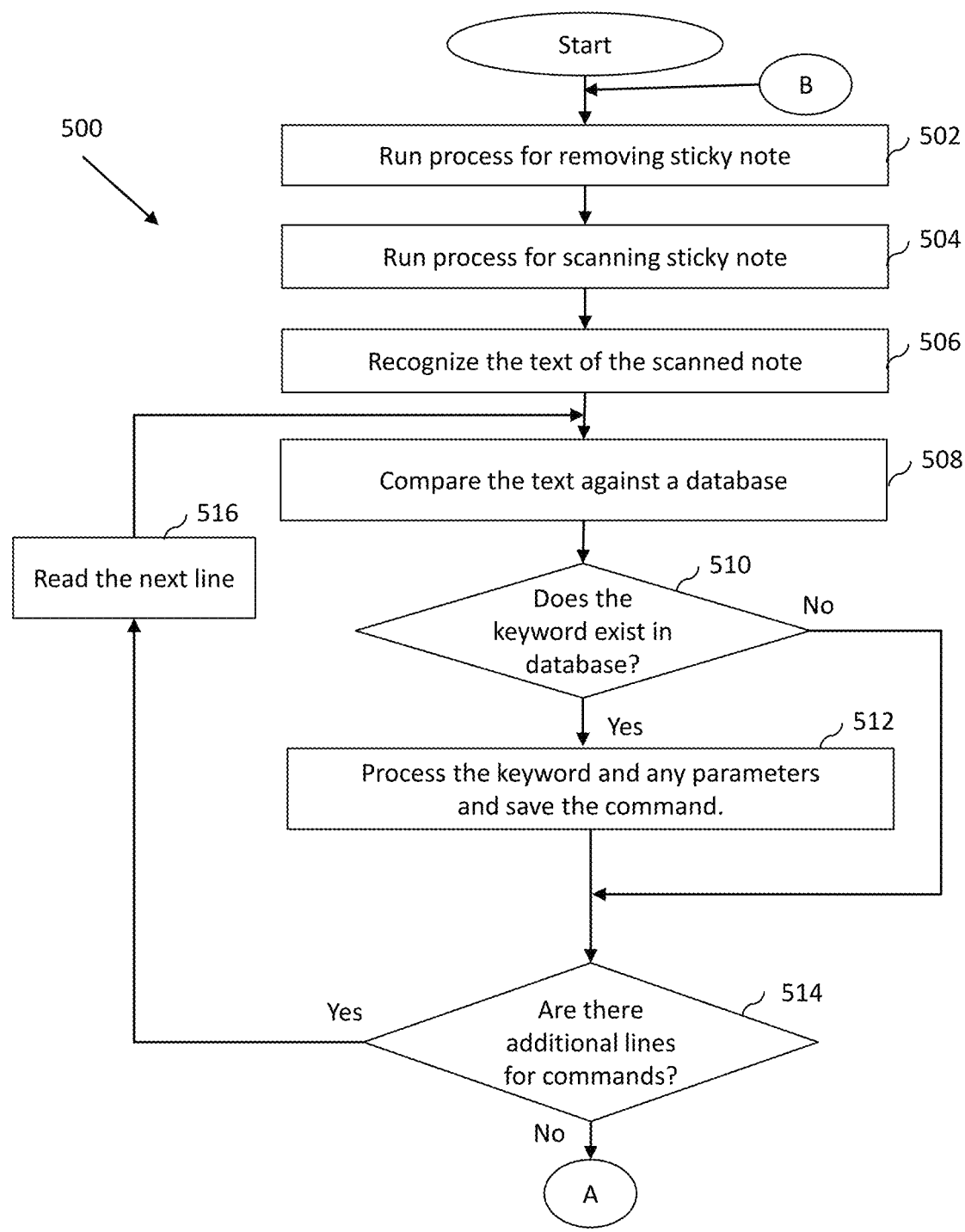
FIGS. 11A and 11B are flowcharts illustrating a sticky-note note processing method that may be carried out by the image forming apparatus of FIG. 1, in accordance with certain embodiments of the presently disclosed technology.
Figure 11B:
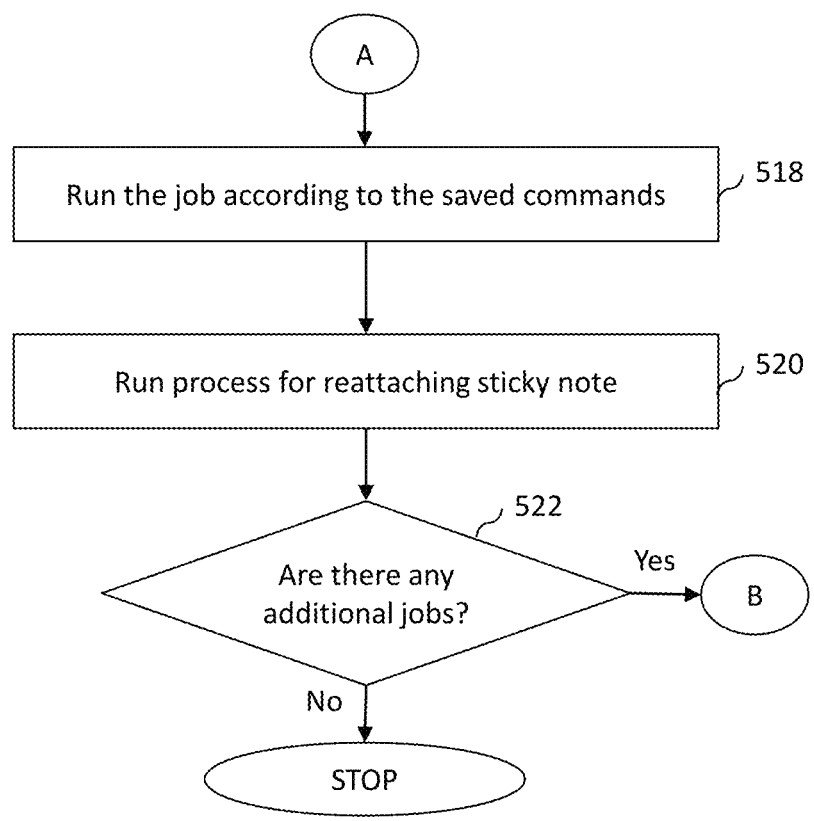

FIGS. 11A and 11B are flowcharts illustrating a note processing method 500 carried out by the image forming apparatus 100, according to certain embodiments of the presently disclosed technology. The method 500 may be best understood in conjunction with FIGS. 1 through 7.

At step 502, a process is run for removing a sticky note from a document. In some implementations, the document such as the document 304 is received by a scanning unit such as the scanning unit 118 of the image forming apparatus 100 with the note such as the note 302 attached thereto, and note removal is performed by the scanning unit 118. In certain embodiments of the presently disclosed technology, prior to removal of the note, the operation panel 108 may be configured to ask such questions as "Document includes sticky note?" and "Scan document and note separately?"

At step 504, a process is run for scanning the detached note 302 by the scanning unit 118. The scanned note 302 is stored in the memory 110, or at the user computing device 114.

At step 506, the text of the scanned note is recognized using optical character recognition (OCR) technology. The scanned note 302 may be in a document format such as PDF or an image format such as JPEG. In certain embodiments of the presently disclosed technology, the text recognition module 602 (FIG. 8) is configured to recognize one or more keyword strings from the scanned note 302.

At step 508, the text recognition module 602 compares the recognized text against the database 605 to identify predetermined keyword strings in the recognized text. The database 605 includes a structured way of preserving data in memory or storage space. Examples of the database 605 include but are not limited to, SQL, MongoDB, PostGres etc. In some implementations, the database 605 may include a look-up table of predefined keyword strings and commands. The keyword strings in the recognized text may be compared against commands in the database 605.

At step 510, it is checked if the keyword strings corresponding to the recognized text exist in the database 605. If a keyword string is found in the database 605, then at step 512, the keyword string and corresponding parameters are processed, and a corresponding command is saved. If the keyword string is not found in the database 605, then step 514 is performed.

At step 514, it is checked if there are additional lines for a command(s) in the recognized text. Sometimes a keyword string may be too long and divided into two or more lines. If there are additional lines for a command(s) in the recognized text, then step 516 is performed. At step 516, the next line is read, and process flow of the method goes back to step 508. Reading a next line is to the benefit of seeing whether a continuous string of characters make sense. If there are no additional lines for a command(s) in the recognized text, then at step 518, the job(s) corresponding to the saved command(s) is run. Examples of the job include, but are not limited to, printing, copying, scanning, emailing, and file conversion of the detached document 304.

It should be understood that some commands may be inter-job, that is, common across a given set of jobs. Such a command may involve, for example, combining the next three batches of documents into a single master document to be saved; a common scanning setting such as a DPI of 300, 600, 1,200; processing in color or black and white; or enlarging the document sheets by a factor of n. Such inter-job commands mean that a given command doesn't have to be run one by one for each document in a batch, but can be performed once for multiple batches/jobs.

Further, at step 520, the above-described process for reattaching the sticky note 302 to the document 304 is carried out in implementations where the scanning unit 118 includes the third roller 318 (FIG. 7) for reattaching the note 302 to the document 304. Again, in such implementations the operation panel 108 may be configured to query the user "Reattach note to document?" and in response to user affirmation entered via the operation panel 108, to signal the scanning unit 118 to execute the note-reattachment process.

Finally, at step 522, it is checked if there are any additional jobs. If there is no additional job, then the method 500 ends. If there is an additional job, then the method 500 restarts at step 502.

Given that handwritten text on a sticky note, despite being of the minimal legibility necessary to allow the OCR functionality of the text recognition module 602 to operate successfully, may include typos, in certain implementations the text recognition module 602 may be configured to employ approximate string matching ("fuzzy string searching") in comparing the recognized text against the database 605. In some embodiments, the text recognition module 602 may be configured to employ semantic search techniques, comparing two or more words in a keyword string to provide contextual parameters for searching the database 605, so as to improve the likelihood and efficiency of finding a corresponding keyword string/command. Also contemplated is employing machine learning to assist the functionality of the text recognition module 602.

Note that throughout the disclosure, numerous references may be made regarding servers, services, engines, modules, interfaces, portals, platforms, or other systems formed from computing devices. It should be appreciated that the use of such terms is deemed to represent one or more computing devices having at least one processor configured to or programmed to execute software instructions stored on a computer-readable tangible, non-transitory medium or also referred to as a processor-readable medium. For example, a server can include one or more computers operating as a web server, database server, or another type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "receiving," or "authenticating," or "facilitating," or "executing," or "capturing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Further, the terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for automatically running an image-processing command from written text on a note sheet detachably attached to a document received in an image forming apparatus, the method comprising:
   in a scanning unit of the image forming apparatus, scanning the document with the note sheet;
   in the scanning unit, automatically detaching the note sheet from the document;
   in the scanning unit, scanning the note-sheet-detached document and the note sheet separately;
   in a text recognition module of a note processing unit in the image forming apparatus, recognizing written text on the scanned note sheet to identify predetermined keyword strings in the recognized text;

extracting one or more commands from a database corresponding to the keyword strings identified from the recognized text; and automatically running the one or more commands to cause the image forming apparatus to execute one or more corresponding image-processing jobs on the note-sheet-detached document.

2. The method of claim 1, wherein the note sheet is a sticky note with a self-adhesive strip.

3. The method of claim 1, wherein the text of the scanned note is recognized by the text recognition module using optical-character-recognition technology.

4. The method of claim 1, wherein the database includes a lookup table of one or more predefined keyword strings, and corresponding commands.

5. The method of claim 1, wherein the one or more commands include an instruction to the image forming apparatus to execute a job selected from at least one of: scanning, printing, copying, storing and emailing the note-sheet-detached document.

6. The method of claim 1, wherein the extracting one or more commands from a database corresponding to the recognized text comprises:

searching in the database for one or more keyword strings in the recognized text;

if a keyword string is found in the database, extracting a corresponding command; and if the one or more keyword strings in the recognized text are not found in the database, reading one or more next lines of the recognized text.

7. The method of claim 1, wherein the image forming apparatus is linked to a computing device with a display, the method further comprising:

adding into the scanned note a hyperlink linking the note-sheet-detached document to another document in storage accessible by the computing device; and displaying the scanned note with the hyperlink on the display, to enable a user to access the other document.

8. The method of claim 1, further comprising displaying contents of the scanned note in a language different from an original language of the recognized text on the scanned note.

9. The method of claim 1, wherein the automatically detaching the note sheet from the document comprises:

bringing a paper lifter mechanism against the document, the paper lifter mechanism being configured to move a first edge of the document vertically, the first edge being disposed paralleling a non-adhesive edge of the note sheet;

moving the paper lifter mechanism in a vertically downward direction based on a position of the note sheet in the scanned document, wherein the vertical downward motion of the paper lifter mechanism results in the first edge curving downward, thereby opening a gap between the non-adhesive edge of the note sheet and the document, exposing the non-adhesive edge;

providing a pivotal scanning device for scanning the note sheet, the pivotal scanning device carried pivotably to pivot in a plane perpendicular to the document, the pivotal scanning device including a note-sheet scanner, first and second rollers, enabled to rotate at a predefined speed in a predefined direction, to move the note sheet across the note-sheet scanner, and a note-wedging guide carrying the note-sheet scanner and the first and second rollers, the note-wedging guide having a leading edge;

situating the leading edge of the note-wedging guide in the gap between the non-adhesive edge of the note sheet and the document;

rotating the first and second rollers in a first direction, to catch the non-adhesive edge of the note sheet between the first and second rollers and the note-wedging guide and pull the note sheet towards the note-sheet scanner; and pivoting the pivotal scanning device, while continuing to rotate the first and second rollers in the first direction, to pull the note sheet away from the document and peel an adhesive edge of the note sheet, opposite the non-adhesive edge of the note sheet, off of the document, detaching the note sheet from the document.

10. The method of claim 1, further comprising the scanning unit automatically reattaching the note to the document at an original position of the note on the document.

11. A system for automatically running an image-processing command from written text on a note sheet detachably attached to a document received in an image forming apparatus, the note sheet being a sticky note with a self-adhesive strip, the system comprising:

a memory for storing one or more instructions; and a processor communicatively coupled to the memory, wherein the processor is configured to execute the one or more instructions in the memory to enable a scanning unit of the image forming apparatus to scan the document with the note sheet, automatically detach the note sheet from the document, and scan the note-sheet-detached document and the note separately, in a text recognition module of a note processing unit in the image forming apparatus, recognize written text on the scanned note sheet to identify predetermined keyword strings in the recognized text, using optical-character-recognition technology;

extract one or more commands from a database corresponding to the keyword strings identified from the recognized text; and automatically run the one or more commands to cause the image forming apparatus to execute one or more corresponding image-processing jobs on the note-sheet-detached document.

12. The system of claim 11, wherein the database includes a lookup table of one or more predefined keyword strings, and corresponding commands, and wherein the one or more commands include an instruction to the image forming apparatus to execute a job selected from at least one of: scanning, printing, copying, storing and emailing the note-sheet-detached document.

13. The system of claim 11, wherein the extracting one or more commands from a database corresponding to the recognized text comprises:

searching in the database for one or more keyword strings in the recognized text;

if a keyword string is found in the database, extracting a corresponding command; and if the one or more keyword strings in the recognized text are not found in the database, reading one or more next lines of the recognized text.

14. The system of claim 11, wherein the image forming apparatus is linked to a computing device with a display, and the processor is further configured to execute the one or more instructions of the memory to:

add into the scanned note a hyperlink linking the note-sheet-detached document to another document in storage accessible by the computing device, and the scanned note with the hyperlink on the display, to enable a user to access the other document; and display contents of the scanned note in a language different from an original language of the note.

15. An image forming apparatus, comprising:
an image forming unit including
   a printing unit,
   a copying unit,
   a scanning unit configured to receive a document with a note attached thereto, automatically detach the note from the document, and scan the detached document and the note separately, and
   a note processing unit configured to recognize text written on the scanned note, extract one or more commands from a database corresponding to the recognized text, and automatically run the one or more commands for executing one or more corresponding jobs on the note-sheet-detached document;
a central processing unit configured to control operation of the image forming apparatus;
an operation panel including a user interface for receiving one or more user commands and instructions, and outputting one or more options for selection by the user; and
a memory for storing one or more instructions for use by the central processing unit, and user information about one or more users.

16. The image forming apparatus of claim 15, wherein the scanning unit comprises:
   a pivotal scanning device for scanning the note sheet, the pivotal scanning device carried pivotably to pivot in a plane perpendicular to the document, the pivotal scanning device including
      a note-sheet scanner,
      first and second rollers, enabled to rotate at a predefined speed in a predefined direction, to move the note sheet across the note-sheet scanner, and
      a note-wedging guide carrying the note-sheet scanner and the first and second rollers, the note-wedging guide having a leading edge;
   a paper lifter mechanism configured to move a first edge of the document vertically, the first edge being disposed substantially parallel to a non-adhesive edge of the note sheet; and
   a scanning control unit operatively linked to the note-sheet scanner, the first and second rollers, and the paper lifter mechanism, the scanning control unit being configured to
   enable the note-sheet scanner to scan the note sheet as received therein;
   move the paper lifter mechanism in a vertically downward direction based on a position of the note sheet in the scanned document, wherein the vertical downward motion of the paper lifter mechanism results in the first edge curving downward, thereby opening a gap between the non-adhesive edge of the note sheet and the document, exposing the non-adhesive edge;
   situate the leading edge of the note-wedging guide in the gap between the non-adhesive edge of the note sheet and the document;
   rotate the first and second rollers in a first direction, to catch the non-adhesive edge of the note sheet between the first and second rollers and the note-wedging guide and pull the note sheet towards the note-sheet scanner;
   pivot the pivotal scanning device, while continuing to rotate the first and second rollers in the first direction, to pull the note sheet away from the document and peel an adhesive edge of the note sheet, opposite the non-adhesive edge of the note sheet, off of the document, detaching the note sheet from the document; and
   operate the note-sheet scanner while further rotating the first and second rollers, to scan the entirety of the detached note sheet.

17. The image forming apparatus of claim 15, wherein the database includes a lookup table of one or more predefined keyword strings, and corresponding commands, and wherein the one or more commands include an instruction to the image forming apparatus to execute a job selected from at least one of: scanning, printing, copying, storing and emailing the note-sheet-detached document.

18. The image forming apparatus of claim 15, wherein the extracting one or more commands from a database corresponding to the recognized text comprises:
   searching in the database for one or more keyword strings in the recognized text;
   if a keyword string is found in the database, extracting a corresponding command; and
   if the one or more keyword strings in the recognized text are not found in the database, reading one or more next lines of the recognized text.

19. The image forming apparatus of claim 15, wherein the image forming apparatus is linked to a computing device with a display, and the processor is further configured to execute the one or more instructions of the memory to:
   add into the scanned note a hyperlink linking the note-sheet-detached document to another document in storage accessible by the computing device, and the scanned note with the hyperlink on the display, to enable a user to access the other document; and
   display contents of the scanned note in a language different from an original language of the note.

* * * * *